(12) United States Patent
Barrack et al.

(10) Patent No.: US 7,142,551 B2
(45) Date of Patent: Nov. 28, 2006

(54) HARDWARE IMPLEMENTATION OF VOICE-OVER-IP PLAYBACK WITH SUPPORT FOR COMFORT NOISE INSERTION

(75) Inventors: Craig Barrack, Irvine, CA (US); James Yik, Mission Viejo, CA (US)

(73) Assignee: Zarlink Semiconductor V.N. Inc., Irvine, CA (US)

( * ) Notice: Subject to any disclaimer, the term of this patent is extended or adjusted under 35 U.S.C. 154(b) by 1045 days.

(21) Appl. No.: 10/195,657

(22) Filed: Jul. 15, 2002

(65) Prior Publication Data
US 2004/0008715 A1 Jan. 15, 2004

(51) Int. Cl.
H04L 12/28 (2006.01)
(52) U.S. Cl. .................... 370/412; 370/468
(58) Field of Classification Search ........... None
See application file for complete search history.

(56) References Cited

U.S. PATENT DOCUMENTS 5,793,747 A * 8/1998 Kline .................... 370/230
2002/0191625 A1* 12/2002 Kelly et al. ............ 370/412

* cited by examiner

Primary Examiner—Chau Nguyen
Assistant Examiner—Christopher Grey
(74) Attorney, Agent, or Firm—Lawrence E. Laubscher, Jr.

(57) ABSTRACT

Methods and apparatus are presented for scheduling playback for voice data sample packet payloads conveyed over best-effort packet-switched infrastructure. The hardware implementation presented provides support for concurrent and independent comfort noise insertion and for dynamic clock adjustment for telephone sessions provisioned concurrently without making recourse to signaling. The apparatus and methods support high density solutions scaleing up to large numbers of concurrently provisioned telephone sessions.

20 Claims, 5 Drawing Sheets

FIG. 5

StreamID Indexed Forwarding Table (170, 510)

| StreamID | Next Stream Event Time | Packet Available? | Incurred Backlog |
|---|---|---|---|
| 0 | ... | ... | ... |
| 17 | 1046 | 0 | 0 |
| 90 | 1046 | 0 | 0 |
| 351 | 1048 | 0 | 0 |
| 844 | 1046 | 0 | 0 |
| N | ... | ... | ... |

512, 514, 516, 518

170A / 510A:

| StreamID | Next Stream Event Time | Packet Available? | Incurred Backlog |
|---|---|---|---|
| ... | ... | ... | ... |
| 17 | 1086 | 1 | 0 |
| 90 | 1066 | 1 | 0 |

170B / 510B:

| StreamID | Next Stream Event Time | Packet Available? | Incurred Backlog |
|---|---|---|---|
| ... | ... | ... | ... |
| 17 | 1086 | 0 | 0 |
| 90 | 1066 | 0 | 0 |

170C / 510C:

| StreamID | Next Stream Event Time | Packet Available? | Incurred Backlog |
|---|---|---|---|
| ... | ... | ... | ... |
| 844 | 1050 | 0 | 0 |

170D / 510D:

| StreamID | Next Stream Event Time | Packet Available? | Incurred Backlog |
|---|---|---|---|
| ... | ... | ... | ... |
| 351 | 1078 | 0 | 2 |

HARDWARE IMPLEMENTATION OF VOICE-OVER-IP PLAYBACK WITH SUPPORT FOR COMFORT NOISE INSERTION

RELATED APPLICATION INFORMATION

This application is related to co-pending U.S. patent application Ser. No. 10/103,299 filed Mar. 20$^{th}$, 2002 entitled "Method of Detecting Drift Between Two Clocks" and co-pending U.S. patent application Ser. No. 10/139,644 flied May 7$^{th}$, 2002 entitled "Time-Indexed Multiplexing as an Efficient Method of Scheduling in Hardware".

FIELD OF THE INVENTION

The invention relates to provisioning of telecommunication services, and in particular to methods and apparatus for conveying telephone quality voice data over packet-switched data transport networks.

BACKGROUND OF THE INVENTION

In the field of telecommunications, telephone quality services such as the Plain Old Telephone Service (POTS) traditionally has been provisioned over circuit-switched signal transmission infrastructure. There is a current need to provision telephone quality streaming data services over packet-switched data transport infrastructure. There is substantial market pressure towards convergent technologies. Convergent technologies concern the merging of voice, data, and video service provisioning over the same transport infrastructure by integrating telecommunication and computer technologies. Moreover, there is a need to provide high density, implementations supporting an ever increasing number of telecommunication sessions concurrently.

Circuit-switched provisioning and packet-switched provisioning employ different operational principles optimizing different operational parameters. A quality-of-service is defined as a combination of operational parameter values. Circuit-switched provisioning attempts to achieve zero-delay and zero-jitter, while packet-switched provisioning attempts to achieve bandwidth efficiency. The migration from traditional circuit-switched provisioning to packet-switched provisioning is a matter of intense current research and development. Although packet-switched transport adheres to different operational principles from circuit-switched technologies, there is a need to achieve the quality-of-service traditionally provisioned over circuit-switched technologies using packet-switched technologies.

Exemplary implementations of packet-switched telephone service provisioning solutions employ Voice-over-Internet Protocol (VoIP) technologies. VoIP technologies relate to the conveying of VoIP packets in accordance with best-effort service level guarantees. As opposed to circuit-switched technologies, wherein telephone sessions are associated with dedicated end-to-end connections, audio sample groups conveyed by VoIP packets route independently in a packet-switched network. The audio samples form a data stream played back, at a destination end station, using computed playback times referenced to a clock associated with the destination station.

As opposed to traditional telephone service provisioning over dedicated circuits ensuring transmission of voice samples at constant rates, VoIP telephone service provisioning is subject to a best-effort bursty conveyance of VoIP packets. Bursty transmission stems from the fact that each VoIP packet conveys a particular number of voice data samples. Early generated voice data samples accumulate in VoIP packet payloads waiting for later generated voice data samples before transmission.

Other factors related to packet-switched provisioning have to do with packet processing at data transport nodes in packet-switched networks. Packet processing introduces a processing delay in packet transmission. Internet Protocol (IP) data transmission employs store-and-forward techniques whereby packets are stored pending processing. The storage of packets pending processing is subject to queuing techniques, queuing delays, queue service disciplines, etc. all of which introduce variable delays. The combination of these effects is evidenced in a variable packet interarrival time at destination end stations, referred to in the art as jitter.

The above factors have been addressed in connection with telephone service provisioning over packet-switched infrastructure and have been subject to improvement between which:

Co-pending commonly assigned U.S. patent application Ser. No. 10/103,299 entitled "Method of Detecting Drift Between Two Clocks" addresses issues related to dynamic synchronization of source and playback clocks and is incorporated herein by reference. Methods of and apparatus for detecting drift between two clocks were developed. The apparatus comprises a hardware implementation of a clock drift evaluator. The evaluator monitors received packets associated with a data stream, and extracts from each packet a time stamp generated by a source clock. A difference d between the extracted time stamp and the local time is compared against a d_ref value to determine whether the packet was received early or late. On a prescribed schedule, a degree of late or early receipt of packets is compared against a tolerance level to determine whether a relative drift exists between the pacing of the source clock and the pacing of the local clock. The detection of drift between the two clocks provides support for service level guarantees in provisioning data streaming services in packet-switched environments.

Co-pending commonly assigned U.S. patent application Ser. No. 10/139,644 entitled "Time-Indexed Multiplexing as an Efficient Method of Scheduling in Hardware" addresses issues related to hardware process scheduling and is incorporated herein by reference. The presented apparatus includes a table of task lists. Each task list holds specifications of processes requiring handling during a corresponding time interval. Each task list is parsed by a scheduler during a corresponding interval and the processes specified therein are handled. The presented methods of process handling may include a determination of a next time interval in which the process requires handling and inserting of process specifications in task lists corresponding to the determined next handling time. Implementations are also presented in which task lists specify work units requiring handling during corresponding time intervals. The entire processing power of the scheduler is used to schedule processes for handling. Advantages are derived from an efficient use of the processing power of the scheduler as the number of processes is increased in support of high density applications.

Over and above the mentioned improvements, it is necessary to address the facts that best effort IP data transport does not guarantee the transmission of packets, and that a transmitting station may opt to suppress transmission of VoIP packets otherwise conveying voice data samples having a low signal energy. Such silence suppression techniques are beneficial in reducing data transmission bandwidth requirements. Nonetheless, at the receiving end station, non-availability of voice sample data for playback regardless of the reason for non-availability thereof results in silent playback. A reduced apparent quality-of-service is perceived when the audio playback is devoid of sound creating an eerie feeling. Comfort noise insertion techniques must be employed to enhance the perceived quality-of-service.

Having regard to the fact that human speech has an activity factor of about, 0.4, about 60% of voice samples generated in digitizing human speech are silent. A substantial amount of development has been undertaken recently in generating comfort noise patterns—subject matter which is described elsewhere. Largely these recent developments have fallen short of providing suitable methods of inserting comfort noise patterns during playback. Comfort noise insertion at the destination end must take into account: silence suppression instances in the absence of received packets, dropped packet instances evidenced by the absence of received packets, late packet arrivals, etc. Having regard to convergent applications, there is a need to develop apparatus and methods for efficiently inserting comfort noise patterns into multiple voice streams concurrently and independently.

Prior attempts at coordinating timed playback for a large number of VoIP streams scan each stream, for each clock tick of a system clock, to determine whether it is time to play back voice data samples received in a packet associated with the stream or whether to insert comfort noise in the stream playback. For each system clock tick, some streams will have to be attended to and some will not. Every stream needs to be scanned on every clock tick—every 125 µs. Such scanning solutions are unscalable and inadequate for convergent solutions.

There therefore is a need to provide methods and apparatus for comfort noise insertion having regard to the above presented factors.

SUMMARY OF THE INVENTION

In accordance with an aspect of the invention, a scheduling apparatus for data streaming services is provided. The scheduling apparatus includes time indexed task scheduling storage for retrievably storing task scheduling information. The time indexed storage further includes time sequenced entries. Each one the time sequenced entries references a plurality of task lists. Work units scheduled for handling during a time interval corresponding to a particular time sequenced entry are referenced in a corresponding work unit task list. Data streams scheduled for handling during the same time interval are referenced in a corresponding stream event task list. A scheduler handles tasks specified in the task lists during respective time intervals. The scheduling apparatus further includes stream indexed forwarding information storage for retrievably storing request forwarding information. A request forwarding module processes task scheduling information and request forwarding information, to generate at least one handling request. The scheduling apparatus also includes a work unit storage for retrievably storing at least one work unit.

In accordance with another aspect of the invention, a method of forwarding handling requests is provided. A plurality of work unit handling tasks are received during each one of a plurality of sequential handling time intervals, each work unit handling task being associated with a corresponding stream. A plurality of stream event handling tasks are received during each one of the sequential handling time intervals.

A handling request is forwarded for each one of the plurality of work unit tasks, if a stream event handling task corresponding to the stream association of the work unit task was received during the same handling time interval.

A stream idle handling request is forwarded for each one of the plurality of stream event handling tasks is received during a particular time interval without having received a work unit handling task associated with the same stream.

A delayed handling request is forwarded for each one of the plurality of work unit tasks received without receiving a stream event handling task corresponding to the stream association of the work unit task during the same handling time interval.

And, a stream event task is scheduled for a time interval during which a subsequent work unit is expected to be handled.

Advantages are derived from an increased efficiency in scheduling playback handling for voice data sample packet payloads conveyed over best-effort packet-switched infrastructure. Transmission bandwidth is conserved by making use of silence suppression techniques to suppress the conveyance of silent payload packets. The hardware implementation presented provides support for concurrent and independent comfort noise insertion and for dynamic clock adjustment for telephone sessions provisioned concurrently without making recourse to signaling. The apparatus and methods support high density solutions scaleing up to large numbers of concurrently provisioned telephone sessions.

BRIEF DESCRIPTION OF THE DRAWINGS

The features and advantages of the invention will become more apparent from the following detailed description of the preferred embodiments with reference to the attached diagrams wherein:

FIG. 5 is a schematic diagram showing a memory storage structure used in handling tasks in support of a packet-switched streaming service provisioning in accordance with an exemplary embodiment of the invention;

It will be noted that in the attached diagrams like features bear similar labels.

DETAILED DESCRIPTION OF THE DIAGRAMS

Bandwidth conservation is derived from the absence of handshake signaling in effecting silence suppression/comfort noise insertion as well from the absence of signaling in clock synchronization. Although there is a need to solve these problems with respect to VoIP service provisioning, it is understood that the solutions presented herein may be adapted to other implementations in which operational decisions taken by a fist of a pair of co-operating entities are inferred by the second from a noisy output of the first, where the "noise" is variable time delay.

Hardware implementations are preferred in providing support for packet-switched streaming service provisioning. Hardware implementations benefit from a designed response time in processing VoIP packets.

Figure 1:
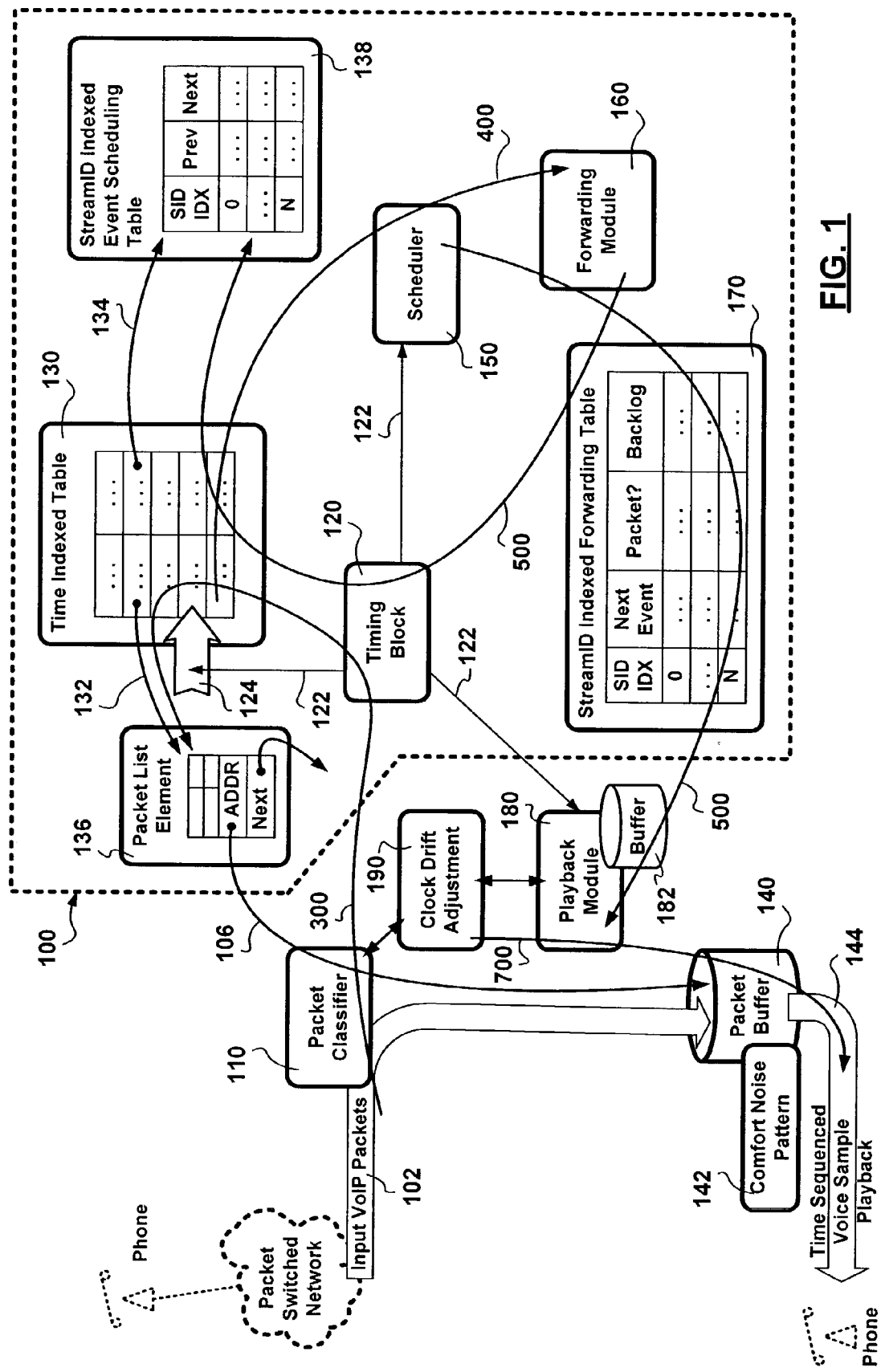
FIG. 1 is a schematic diagram showing elements and relationships therebetween implementing a packet-switched streaming service provisioning in accordance with an exemplary embodiment of the invention.

FIG. 1 is a schematic diagram showing an overview of an exemplary implementation of a playback scheduling engine 100 processing received packets 102.

A packet classifier 110 for front end processing of received VoIP packets 102 operates in accordance with a process 300 presented herein below with reference to FIG. 3. The packet classifier 110 uses timing information derived from received packets 102 and timing information provided by timing block 120 to effect queuing for processing for each received packet 102 in accordance with a queuing discipline implemented using time indexed task scheduling information storage schematically represented by a time indexed table 130.

The architecture of the time indexed task scheduling information store, represented by the time indexed table 130, is designed for processing a group of task lists. Two types of tasks lists are processed concurrently: work unit task lists and event task lists. When the methods presented herein are applied to provisioning VoIP telephone services, each work unit task list is more descriptively referred to as a packet list, and each event task list is more descriptively referred to as a stream event list. The time indexed table 130 stores packet list references 132 and stream event list references 134.

Each packet list is made up of (work unit task list elements) packet list elements 136. Packet list elements 136 are inter-related (interlinked) to define a packet list. Each packet list element 136 is a data structure which holds information relevant to processing a corresponding packet stored in a packet buffer 140.

Each stream event list reference 134 points to entries of a streamID indexed event scheduling table 138. Entries in the streamID indexed event scheduling table 138 reference each other to preferably define doubly-linked stream event lists.

The architecture of the time indexed scheduling information store will be presented in more detail herein below with respect to FIG. 2.

In accordance with a process of operation 400, presented herein below with reference to FIG. 4, the timing block 120 provides a timing signal 122 which is used to advance a selector 124 specifying which entry in the time indexed table 130 is to be scheduled for service.

A scheduler 150 provides, during each appropriate time interval, the information held in the packet list and the stream event list selected by the selector 124, to a forwarding module 160.

Associated with the forwarding module 160 is a streamID indexed forwarding information table 170. The forwarding module 160 performs operations on information stored in the forwarding table 170. Information extracted from packet lists, and the information held in the corresponding stream event lists is combined with information held in the forwarding table 170 to forward playback requests to a playback module 180. The playback module 180 is provided with references 106 to blocks of voice sample data for timely playback. The actions performed by the forwarding module 180 result in modifying both the time indexed table 130 as well as the forwarding table 170.

A small adaptation buffer 182 may be used on the input side of the playback module 180 to store time sequenced playback requests. The actual use and size of the adaptation buffer 182 is a design choice dependent on a desired response of the playback scheduling engine 100 as will be detailed herein below.

Depending on implementation, the packet buffer 140 may also store a comfort noise pattern 142. Therefore the playback module 180 may be presented with references 106 to either voice sample data originating from received packets 102 or with a reference 106 to voice sample data corresponding to the comfort noise pattern 142. A detailed process 600 of operation of the forwarding block 160 is presented herein below with reference to FIG. 6.

A clock drift evaluator 190 is also provided. Clock drift determination is preferably performed as described in co-pending commonly assigned U.S. patent application Ser. No. 10/103,299 referred to above and incorporated herein by reference.

The playback module 180 operates in accordance with a process 700 presented herein below with reference to FIG. 7. The playback module 180 makes use of timing information from the timing block 120, subject to clock drift adjustment provided by the clock drift evaluator block 190, to effect time sequenced voice sample playback 134.

Figure 2:
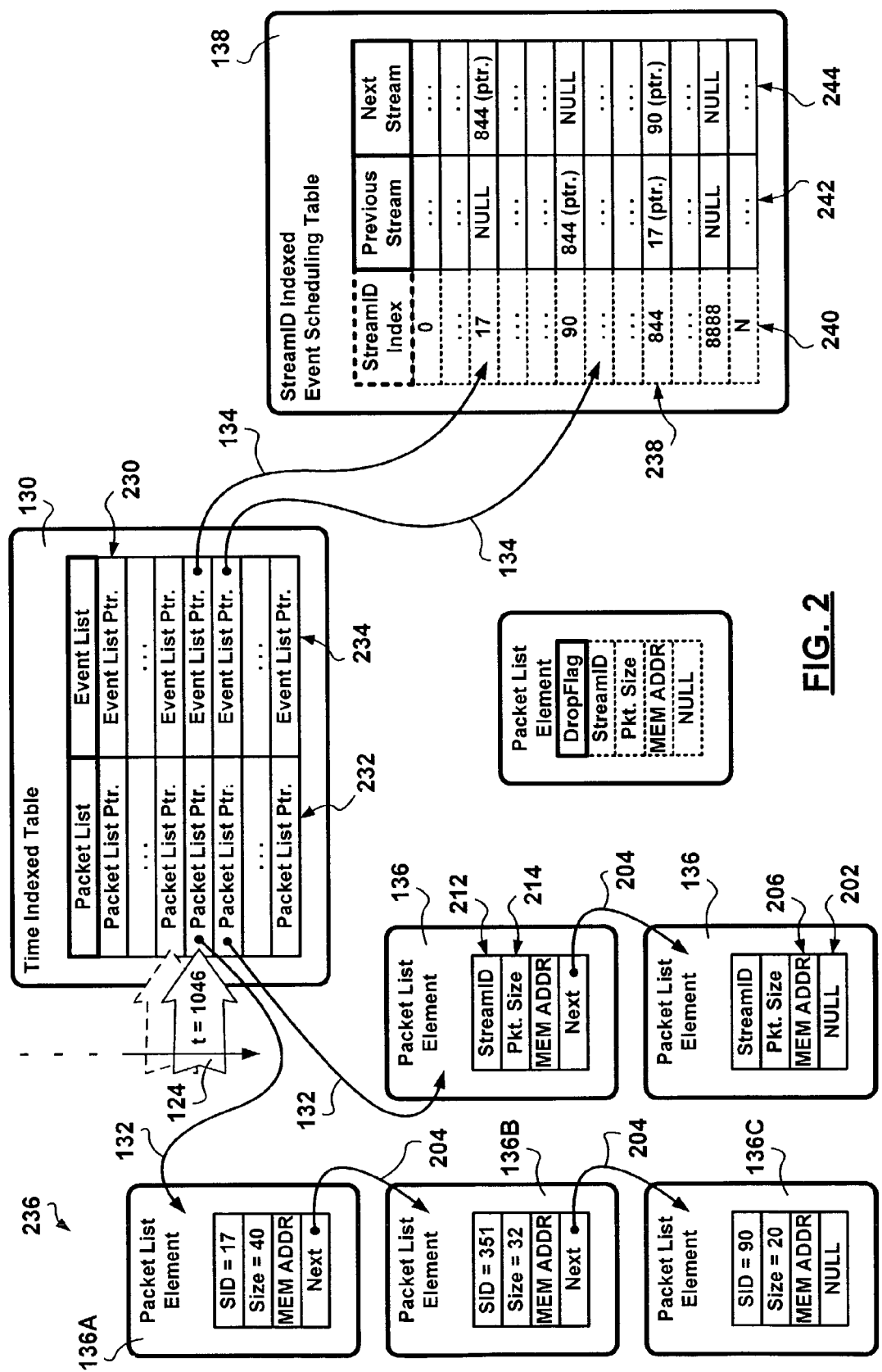
FIG. 2 is a schematic diagram showing memory storage structures used in scheduling tasks in support of a packet-switched streaming service provisioning in accordance with an exemplary embodiment of the invention.

FIG. 2 is a schematic diagram showing details of the time indexed storage of scheduling information.

In accordance with a preferred embodiment of the invention, an efficient approach to schedule handling of received packets 102 and stream events, benefits from a time index multiplexed implementation. Time indexed storage of scheduling information is accomplished via the time indexed table 130. Each row 230 of the time indexed table 130 preferably holds reference specifications 232 and 234 to two corresponding task lists. The packet list references 132 are exemplary reference specifications 232. The stream event list references 134 are exemplary reference specifications 234. If a reference specification 232 holds a "NULL" value, then the corresponding task list 236 does not have any elements. If a reference specification 234 holds a "NULL" value, then the corresponding task list does not have any elements.

In the figure, the current time is t=1045, and on the next tick 122 of the clock signal, VoIP streams 17, 90, 351, and 844 will require playback handling. More details will be provided herein below with reference to FIG. 5.

The time indexed table 130 is preferably organized as a circular buffer, with the ability to preassign handling tasks for received packets 102 and pending stream events. The size of the time indexed table 130 is largely dependent on the granularity of scheduling control and jitter/latency tolerance. For telephony applications human speech is typically sampled at 8 kHz, therefore using 125 µs control granularity. Each row 230 contains the task lists for all packets 102 received and all VoIP stream events that require handling during a corresponding 125 µs time interval. Depending on a particular implementation, a higher scheduling control granularity may be used without limiting the invention thereto.

The circular buffer arrangement must ensure that preassigning handling of tasks does not loop around-and-over the current time interval. The minimum number of rows 230 is dependent on the expected maximum number of voice data samples conveyed by a packet 102 as well on the maximum tolerated jitter. Both the maximum number of voice data samples per packet, and the maximum tolerated jitter are bound values negatively correlated with quality-of-service. The size of the streamID indexed event scheduling table 138 can be preallocated or sized dynamically. The size of the event scheduling table 138 correlates positively with the processing capacity of the provisioned solution. High density convergent applications seek to increase the number N of concurrently provisioned services on scalable implementations.

As will become apparent from the description provided herein below, in scheduling stream events, the time for the next playback event for a stream will equal to the start time of the current playback, plus the playback duration of the currently processed payload. For comfort noise insertion, the playback of a comfort noise pattern having an associated playback duration is used. By making the time indexed table (130) a data structure of 512 rows (230) in the current regime of operating parameters, it is assumed that packet payloads will contain at, most 512×125 µs=64 ms of sampled audio. For packet list tasks, by using a time indexed table data structure (130) of 512 rows (230), it is also assumed that the calculated playback time of any arriving packet 102 not be more than 512×125 µs=64 ms in the future. These correspond to a tolerance for network propagation jitter of 64 ms. A tolerance for jitter in excess of 64 ms would result in nonviable provisioning solutions having poor quality-of-service. Persons of ordinary skill in the art would understand that the above mentioned operational parameter values are design choices based on the current state of technology, undoubtedly these parameters will change with future technological advancements and service provisioning requirements.

The packet list references 132 point to corresponding packet lists 236. More specifically each packet list reference 132 may point to a foremost packet list element 136 in a packet list 236. An exemplary packet list 236 shown is a linked list of packet list element data structures 136A, 136B, and 136C. Specifiers 202 associated with each packet list element data structure 136 hold packet list element references 204 to subsequent packet list element data structures 136. The packet list element reference 204 of the last packet list element 136 in a packet list 236 is a "NULL" reference signifying the end of the packet list 236. No ordering is implied for the packet list elements 136 in a corresponding packet list 236.

Each packet list element 136 data structure further holds a start memory storage address specification 206 specifying the corresponding start memory address reference 106 of the corresponding packet 102 stored in the packet buffer 140. Other information may be held in the packet list element data structure 136 including a streamID specification 212 and perhaps a payload size specification 214 corresponding to the respective packet 102. Preferably the payload size specification 214 specifies the number of voice data samples conveyed by the corresponding received packet (playback duration). To further reduce transport bandwidth requirements, packet payloads may be compressed for transport using various voice compression techniques described elsewhere. The packet payload size specification 214 relates directly to the uncompressed size of packet payloads.

Although the streamID information and payload size information is preferably specified in packet list elements 136, a person of ordinary skill in the art would understand that such information may alternatively be specified elsewhere—in the packet buffer 140 for example along with the voice sample data. The size information may not necessarily be specified for implementations making use of a fixed packet payload size. The invention is not limited only to the storage of information presented, each packet list element data structure may also hold additional information used in servicing packets 102.

Exemplary additional information shown stored in association with packet list element data structures relates to dynamic clock adjustment presented herein below.

Each packet list 236 consolidates packet information regarding packets 102 with a playback time within the 125 µs time interval corresponding to a row 230 of the time indexed table 130. There is a corresponding packet list 236 for each time indexed table entry 230. The number of packet list elements 136 per packet list 236 is variable. Packet list elements 136 are preferably created and destroyed dynamically to adapt to throughput conditions, the largest number of packet list elements 136 in a packet list 236 being equal the number of active VoIP telephone sessions (VoIP streams) provisioned concurrently.

Although the linked list data structure presented is a preferred implementation of a packet list 236, people of ordinary skill in the art would appreciate that various other data structures providing the same result may be used.

The stream event list references 134 point to stream event lists defined by information stored in the event scheduling table 138. More particularly each stream event list reference 134 points to a row 238 in the event scheduling table 138. An exemplary stream event list is shown as a doubly linked list of rows 238 corresponding to events for VoIP streams 17, 90, and 844. Each stream event list consolidates scheduling information regarding streams expecting packet arrivals having handling times within the 125 µs time interval corresponding to a row 230 of the time indexed table 130 regardless of whether a packet is actually available or not.

Preferably, the stream event list is defined as a doubly-linked list of data structures using previous stream 242 and next stream 244 specifications associated with each event scheduling table row 238. The first stream event list element contains a NULL reference in the previous stream specification 242 and the last stream event list element contains a NULL reference in the next stream specification 244.

The stream event list elements are not necessarily ordered. Other stream event lists associated with other corresponding time indexed table rows 230 may be defined concurrently such that each event scheduling table row 238 is included in at most one list. Inactive (idle) VoIP streams not associated with a provisioned service have NULL entries in each one of the previous 242 and next 244 stream specifications.

Rows 238 of the event scheduling table 138 are shown to hold streamID specifications 240, since the event scheduling table 138 is streamID indexed, streamID specifications 240 may not be necessarily stored to reduce memory storage requirements of the solution. Direct memory addressing of rows 238 may be used instead. Depending on the implementation, rows 238 may hold additional information.

It is noted that each VoIP stream can only be referenced at most twice in the task lists corresponding to a row 230 in the time indexed table 130: once in the packet list 126 (streamID specification 212), and once in the stream event list. A plurality of received packets 102 for the same VoIP stream may be referenced in the time indexed table 130, each of which is referenced in a separate packet list 236 corresponding to different rows 230. For the stream event list, no more than one single event task for each VoIP stream is placed into the time indexed table 130 at any given time. The single event task is placed in the time indexed table 130 in the time-indexed row 230 corresponding to the next expected stream servicing event for that VoIP stream (telephone session) regardless of whether a packet is actually available or not.

Figure 3:
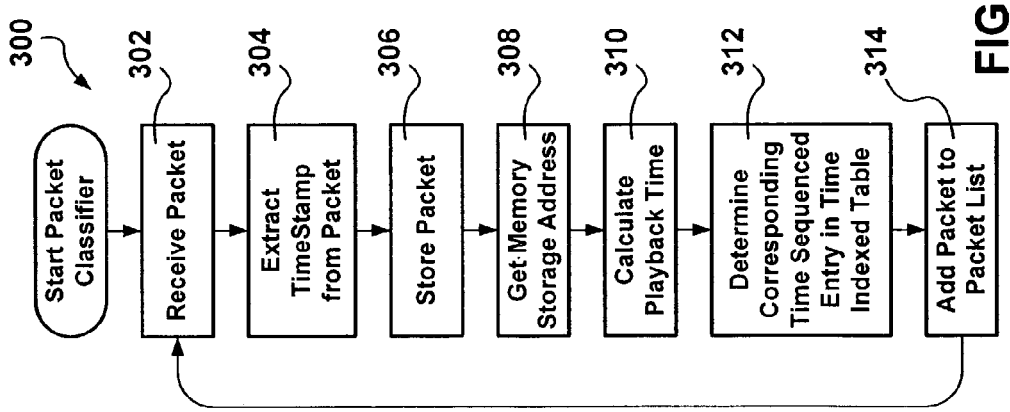
FIG. 3 is a schematic flow diagram showing exemplary process steps for front end processing of received packets in support of a packet-switched streaming service provisioning.

FIG. 3 is a schematic flow diagram showing exemplary steps of a process 300 performed by the playback scheduling engine 100 implementing front end processing of received packets.

For each packet arrival event 302, the packet classifier 110 extracts 304 at least a time stamp value specified in the header of the received packet 102. The time stamp value may be provided to the clock drift evaluator 190. The received packet 102 is stored 306 in the packet buffer 140. The packet buffer 140 provides 308 the packet classifier 110 with the start memory storage address (106) at which the received packet 102 was stored (306).

A playback time t is calculated 310 for the received packet 102. The playback time t may be made available to the clock drift evaluator 190. A time indexed table row 230 corresponding to the calculated (310) playback time t is determined 312. The received packet 102 is queued 314 in the packet list 236 corresponding to the calculated playback time t by (creating) adding a packet list element 136. The reported (308) start memory address (106) for the received packet 102 is used to populate the memory storage address specification 206 (pointer) in the corresponding packet list element 136.

Figure 4:
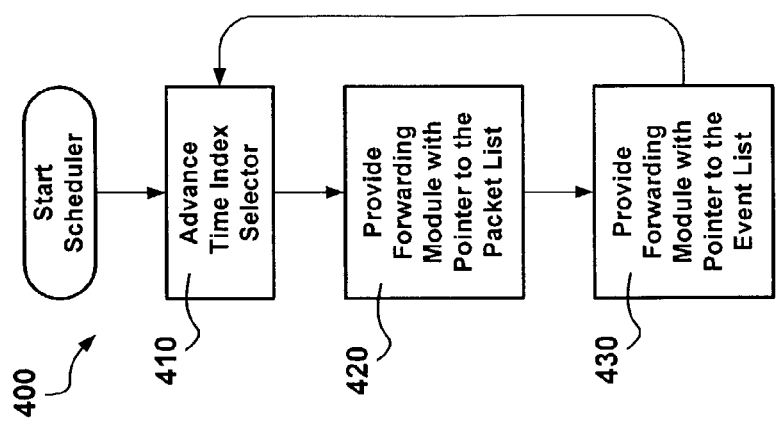
FIG. 4 is a schematic flow diagram showing exemplary process steps of scheduling task handling in support of a packet-switched streaming service provisioning in accordance with an exemplary embodiment of the invention.

Concurrent with the receipt 302 of packets 102 and queuing 314 thereof, the scheduler 150 operates in accordance with the exemplary process 400 show in FIG. 4.

On advancing 410 the selector 124 into the time indexed table 130 responsive to the timing signal 122, the selector 124 points to a particular row 230.

The scheduler 150 provides (420, 430) the forwarding module 160 with stream handling information held in the corresponding packet list and stream event list. If the scheduler provides the forwarding module 160 with references 132 and 134 respectively, the scheduler 150 is then available for processing thus deferring task processing to the forwarding module 160.

Alternatively the scheduler 150 and forwarding module 160 may work cooperatively, the scheduler 150 first parses the packet list 236 corresponding to the current time index, (sequentially) providing 420 the forwarding module 160 with references 204 to each packet list element 136 in the packet list 236. Upon scheduling packets from the packet list 236, corresponding packet list elements 136 may be de-linked from the packet list 236.

Subsequently, the scheduler 150 parses the stream event list corresponding to the current time index, (sequentially) providing 430 the forwarding module 160 with streamID's scheduled for expected handling during the current time interval regardless of the availability of a packet in the corresponding packet list 236.

In providing the forwarding module 160 stream handling information, the scheduler 150 may use message exchange methods.

In the worst case scenario, the maximum number N of VoIP streams supported are active and, all N streams appear in both the packet list 236 and corresponding stream event list associated with the same time indexed table row 230. The playback scheduling engine 100 may be designed with this unlikely scenario representing maximum performance such that the 125 μs time budget is just enough to handle all 2N tasks. However, in practice playback engines 100 are designed to provision a larger number of VoIP streams since the scenario in which all streams appear in both tasks lists is highly unlikely. Nonetheless when this scenario occurs in practice, the preferred designed response is to handle the tasks one-by-one, introducing a small amount of inaccuracy into the playback timing performed by the playback scheduling engine 100. Preferably, the clock signal 122 does not interrupt the scheduler 150 rather triggers the scheduler 150 into operation. If the scheduler 150 is busy handling the tasks list of the previous 125 μs time interval, the trigger remains pending. This however is not a concern, because the over-provisioning of VoIP streams can be engineered such that the timing inaccuracy introduced by the playback engine 100 would be hidden by jitter effects.

In this sense, such implementations of the playback engine 100 may, under such unlikely conditions introduce a small amount of timing inaccuracy: a maximum jitter of 125 μs. A maximum 125 μs of jitter comes from the fact that it is highly unlikely that all streams will be rescheduled in the subsequent time interval since packets 102 carry a substantial number of voice data samples to be played back. The likelihood that all the worst case scenario would be repeated again is even more remote as 64 ms of jitter is typically tolerated.

The actual playback module 182 makes use of the adaptation buffer 182 to conceal jitter introduced by the playback scheduling engine 100. In designing the adaptation buffer 182, the largest size thereof must be enough to store playback requests over and above what the combination of the scheduler 150 and forwarding module 160 can generate in one 125 μs time interval.

In the case in which a comfort noise insertion granularity of one voice data sample is chosen, the possibility to handle all streams during the same 125 μs time interval becomes very probable. The scheduler 150 and the forwarding module 160 must be designed to handle all streams during a single 125 μs time interval on a regular basis—including handling all streams on every tick. For such an implementation the comfort noise insertion mentioned herein merely signals the playback module 180 to perform the noise insertion.

In accordance with another implementation of an exemplary embodiment of the invention, the scheduler 150 also performs operations in queuing packet list elements 136 corresponding to received packets 102 in response to information provided by the packet classifier 110.

The forwarding module 160 receives all tasks to be handled from the scheduler 150. FIG. 5 is a schematic diagram of an exemplary forwarding information storage data structure 170 used by the forwarding module 160 in processing tasks.

The exemplary forwarding table 170 is defined by a group of row entries 510 storing forwarding information. Each forwarding table row 510 has fields storing a next stream event time specification 512, a packet available specification 514, and an incurred backlog specification 516. Each forwarding table row 510 corresponds to a VoIP stream whose streamID specification may also be specified in a field 518. Depending on the implementation, the streamID specification may not be stored to reduce memory storage requirements, such implementations may use direct memory addressing techniques.

There are two ways to initiate stream handling. VoIP stream handling is necessary when a received packet 102 has a playback time equal to a current processing time interval. These VoIP stream handling instances are derived from the packet lists 236. VoIP stream handling is also necessary to play back voice data samples form a subsequent packet after the voice sample data of a packet has been played back. Such VoIP stream handling instances are derived from stream event lists which track stream handling events that "should" occur, regardless of whether a subsequent packet is actually available.

VoIP stream handling is followed by rescheduling a stream handling event in a stream event list. The actual VoIP stream handling may result in a playback request providing the playback module 180 with voice sample data derived from a received packet 102 or voice sample data corresponding to a comfort noise pattern 142. The forwarding module 160 determines whether comfort noise should be inserted and informs the playback module 180 to do so. All voice sample data and comfort noise insertion have a playback duration measured in 125 µs time intervals. The next stream event is scheduled during a subsequent 125 µs time interval immediately following the end of the current playback to enable back-to-back playback. A stream event is requeued in the stream event list associated with the corresponding time indexed table row 230. A packet having a playback time corresponding to the particular row 230 is expected to arrive. Silent packet suppression and packet loss prevent the fulfillment of the packet arrival expectation while transport jitter causes the expectation to be postponed.

There are three scenarios of operation of the forwarding module 160.

In accordance with a first scenario, a received packet 102 associated with a streamID is referenced 106 in a packet list element 136 of a packet list 236 of a currently processed time indexed table row 230, and a stream event for the same streamID is referenced in the corresponding stream event list. This is exemplary of instances in which the received packet 102 has a calculated playback time equal to the time that a packet is expected to be played back and represents the expected mode of operation of the solution.

An exemplary representation of this first scenario is shown in FIG. 2. Packet list element 136A of packet list 236 references a packet associated with streamID (SID) 17 while the corresponding stream event list references streamID 17. Packet list element 136C of packet list 236 references a packet associated with streamID (SID) 90 while the corresponding stream event list references streamID 90.

Figure 6:
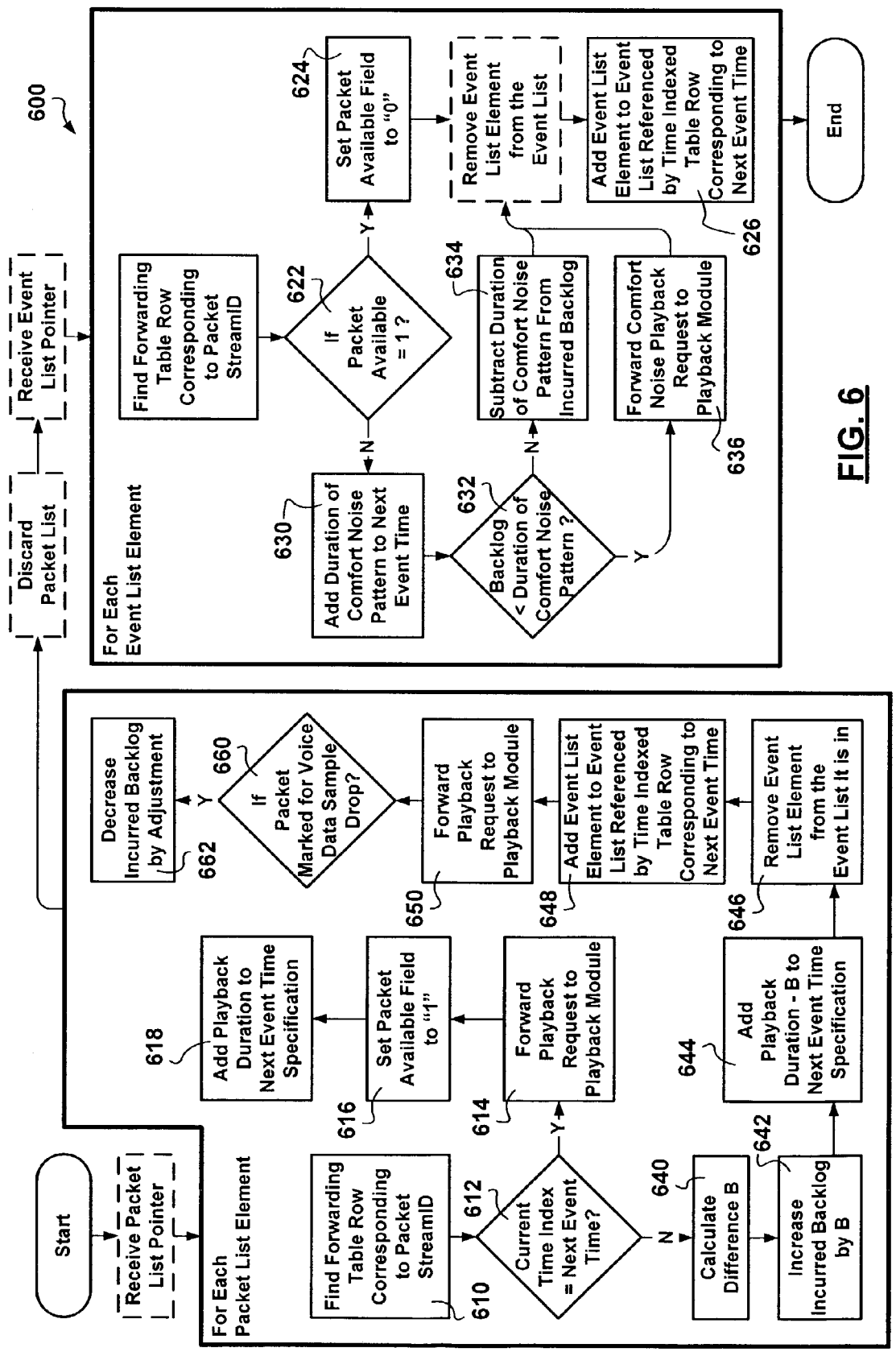
FIG. 6 is a schematic flow diagram showing exemplary process steps for timely forwarding of playback requests in accordance with an exemplary embodiment of the invention.

Referring now to FIG. 6, the forwarding module 160 uses the streamID specification 212 from the packet list element 136 to find 610 a corresponding forwarding table row 510 in the forwarding table 170. The forwarding module 160 checks 612 whether the corresponding next stream event time specification 512 is equal to the current 125 µs time interval. For this scenario there will be a match. The forwarding module 160 forwards 614 a corresponding playback request to the playback module 180. The corresponding packet available specification 514 is set 616 to a logic high value, typically "1". And, the playback duration of the packet payload is added 618 to the value held in the next event time specification 512. The modified forwarding table excerpt 170A shows the result of steps 610 through 618 performed in turn for both packet list elements 136A and 136C. It is noted that the difference in packet payload playback durations lead to different corresponding next stream event times.

In processing stream events specified in the corresponding stream event list, see FIG. 5, for each event, the forwarding module 160 finds 620 the forwarding table row 510A corresponding to the specified streamID. If (622) the associated packet available specification 514 holds a logic high value, typically "1", the packet available specification 514 is reset 624 to a logic low value, typically "0". A subsequent corresponding stream event is requeued 626 in the time indexed table 130 based on the modified next stream event time specification 512. Rows 510B show modifications to the forwarding table 170B.

In accordance with a second scenario, a stream event corresponding to a streamID is referenced in a stream event list of a currently processed time indexed table row 230, while no corresponding packet list element 136 associated with the same streamID is referenced in the corresponding packet list 236. This is exemplary of instances in which no packet 102 has arrived having a calculated playback time equal to the time that a packet is expected to be played back.

An exemplary representation of this second scenario is also shown in FIG. 2. The stream event list for t=1046 references streamID 844 while no packet list element 136 in the corresponding packet list 236 references a received packet 102 associated with streamID (SID) 844.

There are several reasons why a packet is expected but none arrives. The most common reason is silence suppression. A voice sample generator associated with the sending end device may determine that a generated packet contains a silent payload, and decides to save network bandwidth by suppressing packet transmission. Other reasons include packet loss or severe transport delay. In such cases, in lieu of forwarding a packet reference to a received packet 102 in the playback request, the forwarding module 160 informs the playback module 180 to perform comfort noise insertion.

In accordance with a preferred implementation, the playback scheduling engine 100 is a flow-independent service module. Therefore, it is beyond the scope of the present disclosure to specify how the playback module 180 should respond. Assumptions are made about the playback module 190 in engineering the operation of the playback scheduling engine 100. The playback module 180 is assumed to have minimum logic, simply playing back obliviously voice data samples provided thereto via the adaptation buffer 182. The adaptation buffer 182 maintains voice data sample information—a combination including but not limited to: voice data samples and references thereto.

In accordance with the preferred embodiment of the invention, the forwarding module 160 makes a decision as to when comfort noise is to be inserted. The forwarding module 160 must know the playback duration of the comfort noise pattern 142 that will be inserted. The forwarding module 160 may determine and specify the playback duration of the comfort noise pattern 142 to be inserted.

Referring now to FIG. 6, upon receiving an event handling request for streamID 844, the forwarding module 160 uses the streamID specification to find 620 a corresponding forwarding table row 510 in the forwarding table 170. If (622) the associated packet available specification 514 does not hold a logic high value, typically "1", the playback duration of the comfort noise pattern 142 is added 630 to the next event time specification 512.

If (632) the corresponding incurred backlog specification 516 holds a value exceeding or equal to the playback duration of the comfort noise pattern 142, then the playback duration of the comfort noise pattern 142 is subtracted 634 from the value of the incurred backlog specification 516. The third scenario presented herein below will detail causes of incurred backlog.

Only if (632) the corresponding incurred backlog specification 516 holds a value less than the playback duration of the comfort noise pattern 142, does the forwarding module 160 inform 636 the playback module 180 in the playback request to perform comfort noise insertion. The playback request may include a default comfort noise pattern reference 106.

Steps 632–636 are critical, because if too much comfort noise had been inserted previously, then a backlog would have developed. Therefore, if the incurred backlog (516) is sufficiently large, it can be substituted for comfort noise playback thus discharging the backlog.

The stream is requeued 626 for expected re-handling in the time indexed table 130 based on the modified next stream event time specification 512. Row 510C shows resulting modifications to the forwarding table 170.

It is preferable that a comfort noise pattern playback duration be chosen to be less than typical duration of silent periods in human speech to reduce undue introduction of backlog. The duration of typical silent human speech periods is subject to an empirical determination (language to language variations). Yet the playback duration of the comfort noise pattern should be no greater than the mean tolerated packet transport delay so as not to unduly introduce excessive playback delays.

It is preferable that the playback duration of the comfort noise pattern contain a number of voice data samples to generate a true comfort noise pattern typically characterized by randomness, very short comfort noise patterns when played back back-to-back result in an audible tone.

While the decision to insert comfort noise is made by the forwarding module 160, the actual comfort noise insertion is performed by the playback module 180 and is therefore beyond the scope of the present description to define it. In making use of the default comfort noise reference 106 in the playback request, a consistent exchange of information (references 106) is provided between the forwarding module 160 and the playback module 180. For all intents and purposes the default comfort noise reference 106 may be interpreted as a signal by the playback module 180. For this reason the default comfort noise reference 106 may just as well be a NULL reference.

In accordance with an exemplary implementation the playback duration of the comfort noise inserted is an empirically determined fixed size known to the forwarding module 160 and referred to as comfort noise granularity. The default comfort noise reference 106 may point to the comfort noise pattern 142 stored in the packet buffer 140, to be played back in lieu of a real packet payload.

In accordance with another exemplary implementation, the default comfort noise reference 106 would simply alert the playback module 180 to perform more precise comfort noise insertion based upon the voice data sample energy levels of preceding packets associated with the stream. The playback module 180 inserts a comfort noise granule into the output stream. The exemplary implementation may make use of an (external) Digital Signal Processor (DSP).

In accordance with yet another exemplary implementation, the comfort noise pattern 142 stored in the packet buffer 140 has a relatively large number of voice data samples corresponding to a relatively long playback duration, perhaps longer than the tolerated amount of jitter (64 ms), i.e. in excess of 100 ms. In processing of comfort noise insertion instances, the playback module 180 is provided with the default comfort noise reference 106 to the start memory storage location of the 100 ms comfort noise pattern. Prior to actual comfort noise playback, the playback module 190 randomly selects a segment (comfort noise granule) from the comfort noise pattern 142 for play back. This further prevents insertion of high tonal content in comfort noise playback.

In accordance with a third scenario, a received packet 102 is referenced 106 in a packet list element 136 of a packet list 236 currently being processed, while no corresponding stream event is scheduled in the corresponding stream event list. This is exemplary of instances in which a received packet 102 has a calculated playback when the corresponding stream is not expected to be handled.

An exemplary representation of this third scenario is shown in FIG. 2. Packet list element 136B of packet list 236 references a packet associated with streamID (SID) 351 while the corresponding stream event list does not reference streamID 351.

One reason why a received packet 102 has arrived unexpectedly has to do with the granularity of comfort noise insertion mentioned above. The playback duration of the comfort noise pattern 142 will likely exceed one 125 µs time interval making it possible for too much comfort noise to been inserted. In accordance with this scenario, a packet 102 will be ready for playback before the current playback has fully played out.

Referring to FIG. 6, the forwarding module 160 uses the streamID specification 212 from the packet list element 136 to find 610 a corresponding forwarding table row 510 in the forwarding table 170. The forwarding module 160 checks 612 whether the corresponding next stream event time specification 512 is equal to the current 125 µs time interval. The current time index value (t=1046) is observed to be less than the value held in the next event time specification 512 (t=1048). The difference B between the current time index value and the value held in the next stream event specification is calculated (640). The incurred backlog specification is increased (642) by B. The playback duration of the packet payload, less the incurred backlog B, is added 644 to the value held in the next event time specification 512 in an attempt to synchronize rescheduled stream events with subsequent packet arrivals.

When stream events are processed for the current time indexed table row 230, no corresponding stream event element will be found. The stream event element is dequeued 646 from whatever stream event list it is currently in before requeuing thereof. The streamID indexed storage (138) and the doubly-linked list structure of each stream event list makes the dequeuing operation simple and efficient. The streamID indexed event scheduling table 138 is searched based on the streamID specification 212.

A stream event is requeued 648 in the time indexed table 130 based on the modified next stream event time specification 512. Rows 510D show resulting modifications to the forwarding table 170.

The forwarding module 160 forwards 650 the playback request to the playback module 180 perhaps via the adaptation buffer 182. At that time, the current packet would not have finished playback. As mentioned above, the playback module 180 simply plays back voice data samples pointed to by references 106 one after the other as received.

No assumptions are made in regards to knowledge about backlogs being relayed to the playback module 180. The backlog is carried forward until discharged as described in the second scenario. Jitter effects will help mitigate backlogs. The adaptation buffer 182 stores the backlog of playback requests (references 106). The size of the adaptation buffer 182 can be relatively small. In the worst case all N streams are backlogged, the adaptation buffer 182 at most requiring storage for N playback requests (reference pointers 106).

Depending on the implementation, the forwarding module 160 may receive the entire packet list 236 for processing, by being provided with the packet list reference 132 or my receive packet list element references 204.

Depending on the implementation, the forwarding module 160 may provide the playback module 180 with either packet references 106 or packet list element references 204. The last one of the forwarding module 160 or the playback module 180 to use the packet list element data structures 136 is responsible for freeing thereof for subsequent reuse.

Depending on the implementation, the forwarding module 160 may receive the entire stream event list for processing by being provided with the stream event list reference 134 or my be receive streamID specifications 240.

In order to simplify the presentation of the concepts above, it was assumed that the generator clock and the playback clock are synchronized. The assumption is valid for bounded periods of time for which the amount of drift between the two clocks is less than a 125 µs sampling time interval. This disclosure does not preclude any particular procedure for detecting clock drift. Dynamic clock adjustment may be performed when necessary and typically has a cyclical effect as described in the above mentioned co-pending commonly assigned U.S. patent application Ser. No. 10/103,299.

Clock drift is detected by the clock drift evaluator 190 external to the playback scheduling engine 100. Time stamps are acquired from received packets 102 and playback times calculated during front end processing. The time stamps are typically derived from data transport protocol headers. An example of time stamp extraction is described in co-pending commonly assigned U.S. patent application Ser. No. 10/033,498 entitled "Generic Header Parser providing support for Data Transport Protocol independent Packet Voice solutions" and incorporated herein by reference. Playback times for each packet are provided to the playback scheduling engine 100.

If clock drift is detected and the type of drift determined, playback times will have to be adjusted. The generator clock will have to be considered absolute, for the generator clock may not necessarily be in a realm of control of the solution provider.

If the playback clock is detected to play back voice data samples for a stream too fast compared to the pacing rate of the generator clock, then playback needs to be decelerated. The generator clock can not be adjusted because it may not be in the realm of control of the solution. The playback clock 120 may not be adjusted because the playback of the other streams would be affected.

The result is that the received packets 102 for the affected stream appear to arrive late—which represents another reason for the second scenario presented above. Playback deceleration can be implemented by inserting voice data samples in the playback stream 144 to create an increase in playback delay. The arrangement presented herein already provides just the necessary functionality for inserting comfort noise data samples when received packets 102 arrive late. No special additional functionality is required.

Clock adjustment attempts to change playback timing by one, possibly two, 125 µs time intervals. The comfort noise insertion preferably has a granularity playback duration considerably longer than one clock adjustment: typically more than four 125 µs time intervals. It seems that more backlog is created than benefits are gained from dynamic clock adjustment. In the long run however, with repeated clock adjustments, excess backlog is discharged.

If the playback pacing rate is slower than the sample generator clock, then local playback needs to be accelerated. When this condition is detected, front end processing could assign a sooner packet playback time (i.e. with less delay) prior to providing the playback scheduling engine 100 with the received packet information. It would appear that this playback time reassignment, by itself, would implement the desired acceleration.

Such playback time reassignment fulfills conditions for above presented third scenario resulting in increasing the backlog for that stream by 1. It will be noted that in the third scenario comfort noise insertion subsequently discharged incurred backlog. However, simple playback time reassignment will ultimately create a conflict, possibly causing the backlog to grow unbounded. Reason being, that no opportunities for comfort noise insertion are guaranteed to occur to discharge the backlog. It was mentioned that typical human speech has an activity factor of 0.4—however singing can have an activity factor close to 1.

Suffice it to say that the forwarding module 160 needs to know when stream playback needs to be accelerated due to dynamic clock adjustment.

In accordance with an exemplary implementation, when the clock drift evaluator 190 determines that playback time acceleration is necessary for a stream, besides reassigning the playback time for a received packet 102, the received packet 102 must also be specially marked. At least one voice data sample must be dropped from the corresponding playback 144. The exact implementation details are subject to the operational definition of the playback module 180 and therefore beyond the scope of the present disclosure. Marking a received packet 102 for voice data sample drop may be implemented, as mentioned above, by storing relevant information in the packet list element data structure 136 (shown in FIG. 2). The backlog however should not be increased because voice data samples are dropped. In forwarding the corresponding playback request, the forwarding module 160 detects 660 marked packets and subtracts 662 the amount of the adjustment from the backlog. The backlog field 516 in the corresponding forwarding table row 510 is increased less than would have been otherwise.

Figure 7:
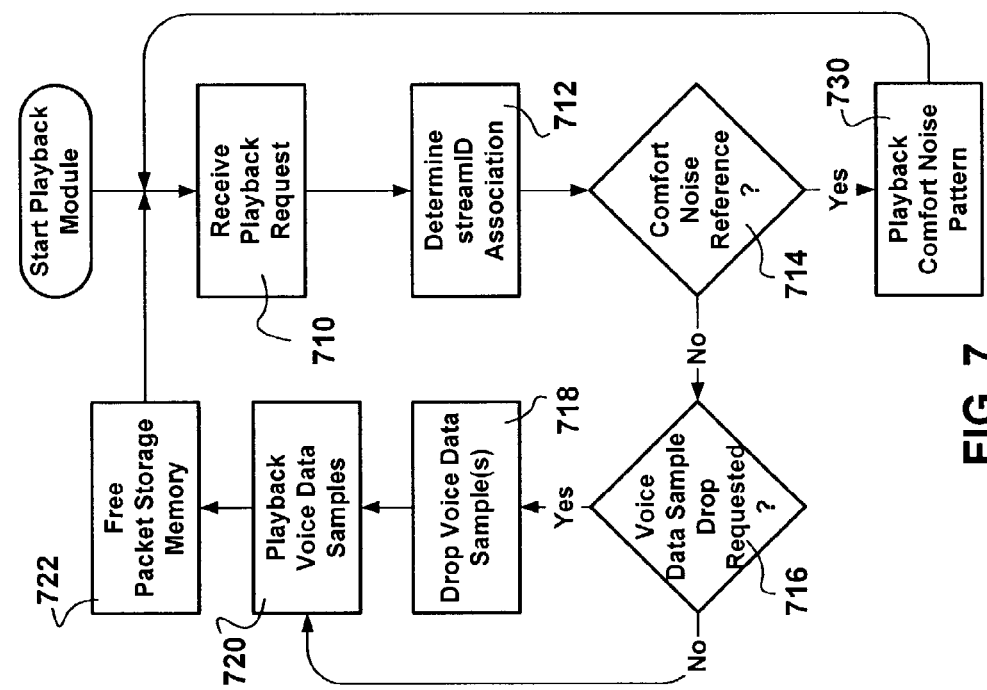
FIG. 7 is a schematic flow diagram showing exemplary process steps for back end processing of packets in support of a packet-switched streaming service provisioning.

FIG. 7 summarizes envisioned operational steps performed by the playback module.

The streamID association is determined 712 for each playback request received 710 by the playback module 180.

If comfort noise insertion is requested (714) by the forwarding module 160, then the playback module 180 performs 730 comfort noise insertion.

If the forwarding module 160 requested the playback of a packet payload (714), then the playback module must determine 716 whether voice data sample drop was requested.

Playback of voice data samples ensues 720, subject to voice data sample drops 718. Once playback of all voice data samples has completed, the playback module 180 frees 722 packet storage memory from the packet buffer 140.

Although the stream event table 138 and the forwarding table 170 have described separately herein, persons of ordinary skill in the art would understand that the two tables may be combined in a single data structure. Benefits of a smaller foot print are derived from the combined data structure arrangement while parallel access benefits are derived from the divided arrangement.

The embodiments presented are exemplary only and persons skilled in the art would appreciate that variations to the above described embodiments may be made without departing from the spirit of the invention. The scope of the invention is solely defined by the appended claims.

We claim:

1. A scheduling apparatus for data streaming services comprising:

a. time indexed task scheduling storage for retrievably storing task scheduling information, the time indexed storage further comprising a plurality of time sequenced entries, each one of the plurality of time sequenced entries referencing a plurality of task lists, work units scheduled for handling during a time interval corresponding to a particular time sequenced entry are referenced in a corresponding work unit task list while data streams scheduled for handling during the same time interval are referenced in a corresponding stream event task list;

b. a scheduler handling tasks specified in the task lists during respective time intervals;

c. stream indexed forwarding information storage for retrievably storing request forwarding information;

d. a request forwarding module processing task scheduling information and request forwarding information to generate at least one handling request; and e. a work unit storage for retrievably storing at least one work unit.

2. A scheduling apparatus claimed in claim 1, further comprising stream indexed event scheduling storage for retrievably storing stream event scheduling information.

3. A scheduling apparatus claimed in claim 2, wherein the stream indexed event scheduling storage stores at least one stream event task list.

4. A scheduling apparatus claimed in claim 1, the stream indexed forwarding information storage further comprising stream sequenced entries, each entry holding stream state information.

5. A scheduling apparatus claimed in claim 1, further comprising a timer pacing the operation of the scheduling apparatus.

6. A scheduling apparatus as claimed in claim 1, wherein the time indexed storage comprises a circular buffer having a size.

7. A scheduling apparatus as claimed in claim 6, wherein the size of the time indexed storage corresponds to a degree of tolerated jitter.

8. A scheduling apparatus as claimed in claim 1, further comprising a selector for selecting, during a time interval, a corresponding one of the plurality of time sequenced entries.

9. A scheduling apparatus as claimed in claim 8, wherein the selector is responsive to a clock signal defining each time interval.

10. A scheduling apparatus as claimed in claim 1, wherein each one of the work unit task list and the stream event task list comprises a linked list.

11. A scheduling apparatus as claimed in claim 10, wherein the work unit task list comprises a singly linked list.

12. A scheduling apparatus as claimed in claim 10, wherein the stream event task list comprises a doubly linked list.

13. A scheduling apparatus as claimed in claim 1, wherein each reference to a work unit comprises a memory address specification into the work unit storage.

14. A scheduling apparatus as claimed in claim 1, wherein each work unit handling task may further specify special work unit handling.

15. A method of forwarding handling requests comprising steps of:

a. receiving a plurality of work unit handling tasks during each one of a plurality of sequential handling time intervals, each work unit handling task being associated with a corresponding stream, b. receiving a plurality of stream event handling tasks during each one of the sequential handling time intervals, c. forwarding a handling request for each one of the plurality of work unit tasks if a stream event handling task corresponding to the stream association of the work unit task was received during the same handling time interval, d. forwarding a stream idle handling request for each one of the plurality of stream event handling tasks is received during a particular time interval without having received a work unit handling task associated with the same stream;

e. forwarding a delayed handling request for each one of the plurality of work unit tasks received without receiving a stream event handling task corresponding to the stream association of the work unit task during the same handling time interval; and f. scheduling a stream event task for a time interval during which a subsequent work unit is expected to be handled.

16. A method of forwarding requests as claimed in claim 15, the method further comprising a prior step of: advancing a selector into a time indexed storage to select a specific time sequenced entry specifying the plurality of work unit handling tasks and the plurality of stream event handling tasks.

17. A method of forwarding requests as claimed in claim 15, the method further comprising a step of: tracking the processing of each work unit handling task.

18. A method of forwarding requests as claimed in claim 15, wherein forwarding the delayed handling request, the method further comprising a step of: tracking an amount of backlog incurred.

19. A method of forwarding requests as claimed in claim 18, further comprising a step of: suppressing the forwarding of the stream idle handling request if backlog was incurred.

20. A method of forwarding requests as claimed in claim 15, wherein scheduling the stream event task, the method further comprises steps of:

a. determining a number of time intervals corresponding to a handing duration of a handling request; and b. scheduling the stream event task after the number of time intervals determined.

* * * * *